(12) United States Patent
Kawanaka et al.

(10) Patent No.: US 9,567,238 B2
(45) Date of Patent: *Feb. 14, 2017

(54) NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: TDK CORPORATION, Tokyo (JP)

(72) Inventors: Yasuyuki Kawanaka, Tokyo (JP); Tomohiko Kato, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,200

(22) Filed: Apr. 22, 2015

(65) Prior Publication Data

US 2015/0311519 A1 Oct. 29, 2015

(30) Foreign Application Priority Data

Apr. 25, 2014 (JP) ................. 2014-091689
Feb. 25, 2015 (JP) ................. 2015-034953

(51) Int. Cl.
| | |
|---|---|
| *H01M 4/48* | (2010.01) |
| *H01M 10/052* | (2010.01) |
| *C01G 49/06* | (2006.01) |
| *H01M 2/16* | (2006.01) |
| *H01M 4/04* | (2006.01) |
| *H01M 4/131* | (2010.01) |

(Continued)

(52) U.S. Cl.
CPC ............. *C01G 49/06* (2013.01); *H01M 2/16* (2013.01); *H01M 4/0404* (2013.01); *H01M 4/0471* (2013.01); *H01M 4/131* (2013.01); *H01M 4/1391* (2013.01); *H01M 4/525* (2013.01); *C01P 2004/04* (2013.01); *C01P 2004/45* (2013.01); *C01P 2006/40* (2013.01); *H01M 4/622* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 2004/021* (2013.01); *H01M 2004/027* (2013.01); *Y02E 60/122* (2013.01)

(58) Field of Classification Search
CPC ............ H01M 10/052; H01M 10/0568; H01M 10/525; H01M 10/0569; H01M 2004/027; H01M 2004/021; H01M 2/16; H01M 4/0404; H01M 4/0471; H01M 4/131; H01M 4/1391; H01M 4/525; H01M 4/622; H01M 4/625; Y02E 60/122; C01P 2006/40; C01P 2004/04; C01P 2004/45; C01G 49/06

See application file for complete search history.

(56) References Cited

FOREIGN PATENT DOCUMENTS

CN 101734726 A 6/2010

OTHER PUBLICATIONS

Kim, Jisun et al., "The Role of Metallic Fe and Carbon Matrix in Fe2O3/Fe/Carbon Nanocomposite for Lithium-Ion Batteries," Journal of the Electrochemical Society, vol. 157, No. 4, (2010), pp. A412-A417.

(Continued)

*Primary Examiner* — Brittany Raymond
(74) *Attorney, Agent, or Firm* — Oliff PLC

(57) ABSTRACT

A negative electrode active material for a lithium ion secondary battery includes secondary particles formed by pri- (Continued)

mary particles containing iron oxide that are linked in a chain.

10 Claims, 3 Drawing Sheets

(51) Int. Cl.
*H01M 4/1391* (2010.01)
*H01M 4/525* (2010.01)
H01M 4/02 (2006.01)
H01M 4/62 (2006.01)
H01M 10/0525 (2010.01)
H01M 10/0568 (2010.01)
H01M 10/0569 (2010.01)

(56) References Cited

OTHER PUBLICATIONS

Zhang et al., "One-dimensional chain Fe3O4 nanoparticles encapsulated in worm-shaped carbon shell," Solid State Communications 144 (2007), 168-173.
Zhu et al., "Template-free synthesis and characterization of novel 3D urchin-like a-Fe2O3 superstructures," J. Mater. Chem., 2006, 16, 1794-1797.

NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATION

This application claims priority from Japanese Patent Application No. 2014-091689 filed with the Japan Patent Office on Apr. 25, 2014, the entire content of which is hereby incorporated by reference.

BACKGROUND

1. Technical Field

The present disclosure relates to a negative electrode active material for a lithium ion secondary battery, a negative electrode for a lithium ion secondary battery, and a lithium ion secondary battery.

2. Related Art

A lithium ion secondary battery is lighter in weight and has higher capacity than a nickel-cadmium battery, a nickel hydride battery, and the like. Thus, lithium ion secondary batteries are widely used as a power supply for portable electronic devices. The lithium ion secondary battery is also a strong candidate for a power supply mounted on hybrid automobiles or electric automobiles. With the decrease in size and increase in functionality of portable electronic devices in recent years, the lithium ion secondary battery used for the power supply is expected to have higher capacity.

The capacity of the lithium ion secondary battery is mainly dependent on an electrode active material. Generally, as a negative electrode active material, graphite is utilized. However, the theoretical capacity of graphite is 372 mAh/g, and a battery with capacity of approximately 350 mAh/g is already put to practical use. In order to obtain a nonaqueous electrolyte secondary battery having sufficient capacity as an energy source for future high-functionality portable devices, even higher capacity needs to be provided. For this purpose, a negative electrode material with greater theoretical capacity than that of graphite is necessary.

An example of such negative electrode active material is a composition containing an iron oxide (oxide containing iron as a constituent element), such as $Fe_2O_3$. The iron oxide is capable of electrochemical adsorption and desorption of lithium ions, and is also capable of charging and discharging of much higher capacity than graphite. However, an iron-based oxide such as $Fe_2O_3$ has extremely low conductivity, so that the actual discharge capacity is small. Thus, in order to increase the conductivity, techniques such as formation of a complex with carbon or metal particles are being considered (Journal of The Electrochemical Society, 157 (2010) A412-A417).

SUMMARY

A negative electrode active material for a lithium ion secondary battery includes secondary particles formed by primary particles containing iron oxide that are linked in a chain.

DETAILED DESCRIPTION OF EMBODIMENTS

Figure 1:
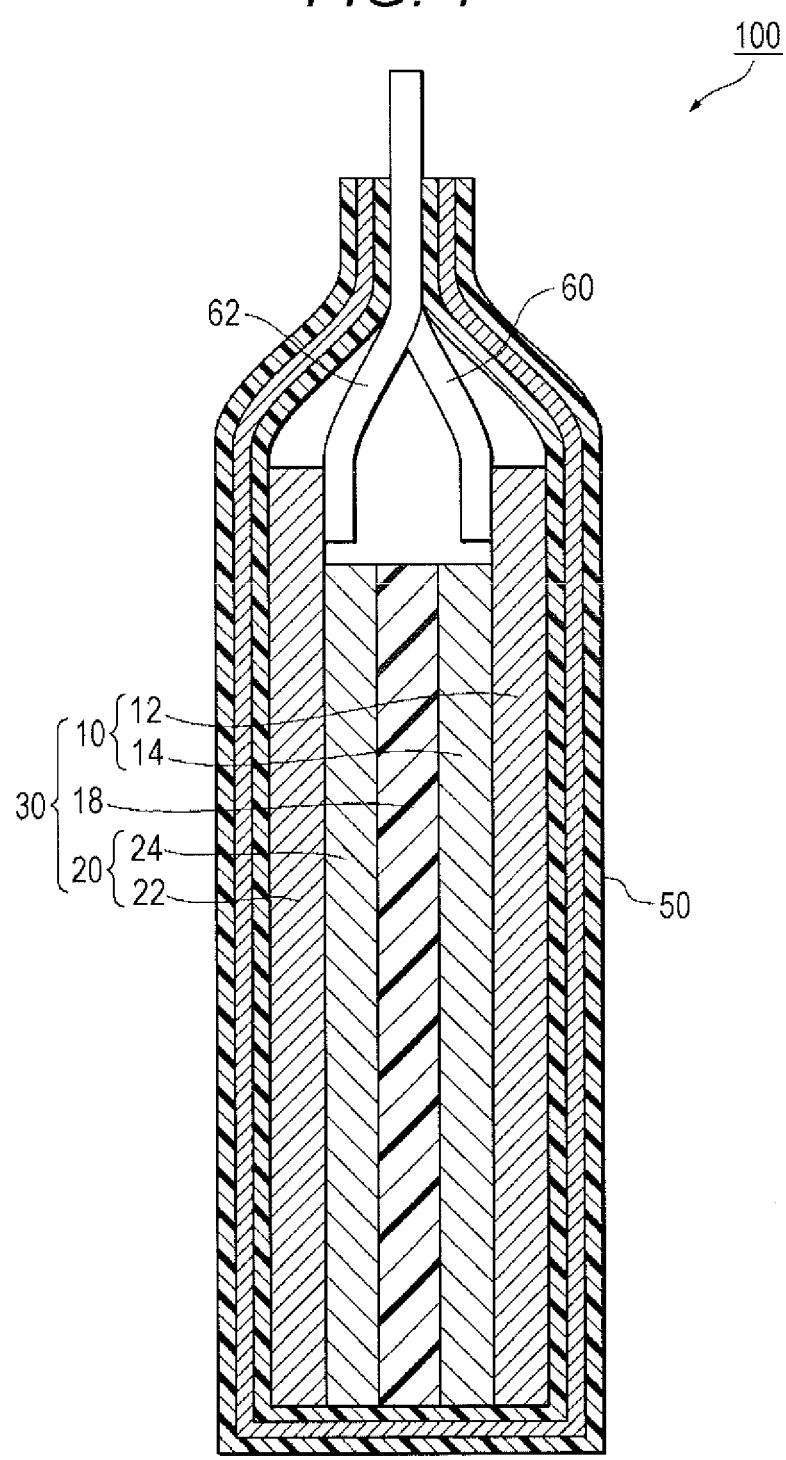
FIG. 1 is a schematic cross-sectional view of a lithium ion secondary battery according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, the discharge capacity of the negative electrode active material described in the above-described document is also insufficient.

An object of the present disclosure is to provide a negative electrode active material for a lithium ion secondary battery having a large discharge capacity, a negative electrode for a lithium ion secondary battery, and a lithium ion secondary battery.

In order to achieve the object, a negative electrode active material for a lithium ion secondary battery according to an embodiment of the present disclosure contains secondary particles formed by iron-oxide containing primary particles linked in a chain.

In the negative electrode active material according to the embodiment of the present disclosure, the primary particles are linked in a chain. Thus, electrons in the negative electrode active material move through the negative electrode active material surface. Accordingly, a reliable conductive path is ensured through the points of contact of the linked primary particles. A conventional conductive path is merely an irregular conductive path based on points of contact between particles. However, in the negative electrode active material according to the embodiment of the present disclosure, a more efficient reliable conductive path is ensured by the regular conductive path, whereby large discharge capacity can be provided.

Further, because the primary particles are linked in a chain, no aggregation of the primary particles occurs. Thus, a reliable conductive path is formed between the primary particles and a conductive auxiliary agent. Accordingly, even larger discharge capacity can be provided.

Incidentally, "in a chain" means that the ratio of the long axis length to the short axis length of the secondary particle formed by the primary particles linked in a chain is 10 or more.

In the negative electrode active material for a lithium ion secondary battery according to the embodiment of the present disclosure, the primary particles containing iron oxide may have a particle diameter of not more than three times a crystallite diameter of the iron oxide.

In the negative electrode active material for a lithium ion secondary battery according to the embodiment of the present disclosure, the secondary particles extending in a chain may have a short axis direction diameter of not more than twice the primary particle diameter.

In the negative electrode active material for a lithium ion secondary battery according to the embodiment of the present disclosure, the secondary particles may be radially aggregated.

According to the embodiment of the present disclosure, a negative electrode active material for a lithium ion secondary battery and a lithium ion secondary battery having large discharge capacity can be provided.

In the following, a preferred embodiment of the present disclosure will be described with reference to the drawings. The present disclosure is not limited to the embodiment described below. The components described below may include other components that may readily occur to those skilled in the art, or other substantially similar components. Further, the components described below may be combined as needed.

(Lithium Ion Secondary Battery)

FIG. 1 is a cross-sectional view illustrating a structure of a lithium ion secondary battery 100.

The lithium ion secondary battery 100 of FIG. 1 includes a case 50, an electrode body 30, and a nonaqueous electrolytic solution containing an electrolyte. The electrode body 30 includes a positive electrode 10, a separator 18, and a negative electrode 20 that are stacked in the case. The separator 18 is disposed between the positive electrode 10 and the negative electrode 20. The separator 18 retains the nonaqueous electrolytic solution. The nonaqueous electrolytic solution serves as a transfer medium for lithium ions between the positive and negative electrodes at the time of charging and discharging.

The lithium ion secondary battery 100 further includes a negative electrode lead 62 and a positive electrode lead 60. One end of the negative electrode lead 62 is electrically connected to the negative electrode 20, while the other end protrudes out of the case. One end of the positive electrode lead 60 is electrically connected to the positive electrode 10, while the other end protrudes out of the case.

The shape of the lithium ion secondary battery is not particularly limited, and may be a cylindrical shape, a rectangular shape, a coin-like shape, a flat shape, a laminated film shape, for example. In the embodiment of the present disclosure, a laminated film is used for the case 50. In examples described below, an aluminum-laminated film type battery is fabricated and evaluated.

The positive electrode 10 includes a positive electrode active material layer 14 disposed on at least one main plane of a positive electrode current collector 12. The positive electrode active material layer 14 includes a positive electrode active material that adsorbs and desorbs lithium ions, a conductive auxiliary agent, and a binder. The negative electrode 20 includes a negative electrode active material layer 24 disposed on at least one main plane of the negative electrode current collector 22. The negative electrode active material layer 24 includes a negative electrode active material that adsorbs and desorbs lithium ions, a conductive auxiliary agent, and a binder.

(Negative Electrode)

The negative electrode active material layer 24 formed on the negative electrode 20 according to the embodiment contains a negative electrode active material, a binder, and a conductive auxiliary agent.

In order to manufacture the negative electrode active material layer 24, first, a paint including the negative electrode active material, the binder, the conductive auxiliary agent, and a solvent is coated onto the negative electrode current collector 22. Then, the solvent in the paint coated on the negative electrode current collector 22 is removed, fabricating the negative electrode active material layer 24.

Figure 2:
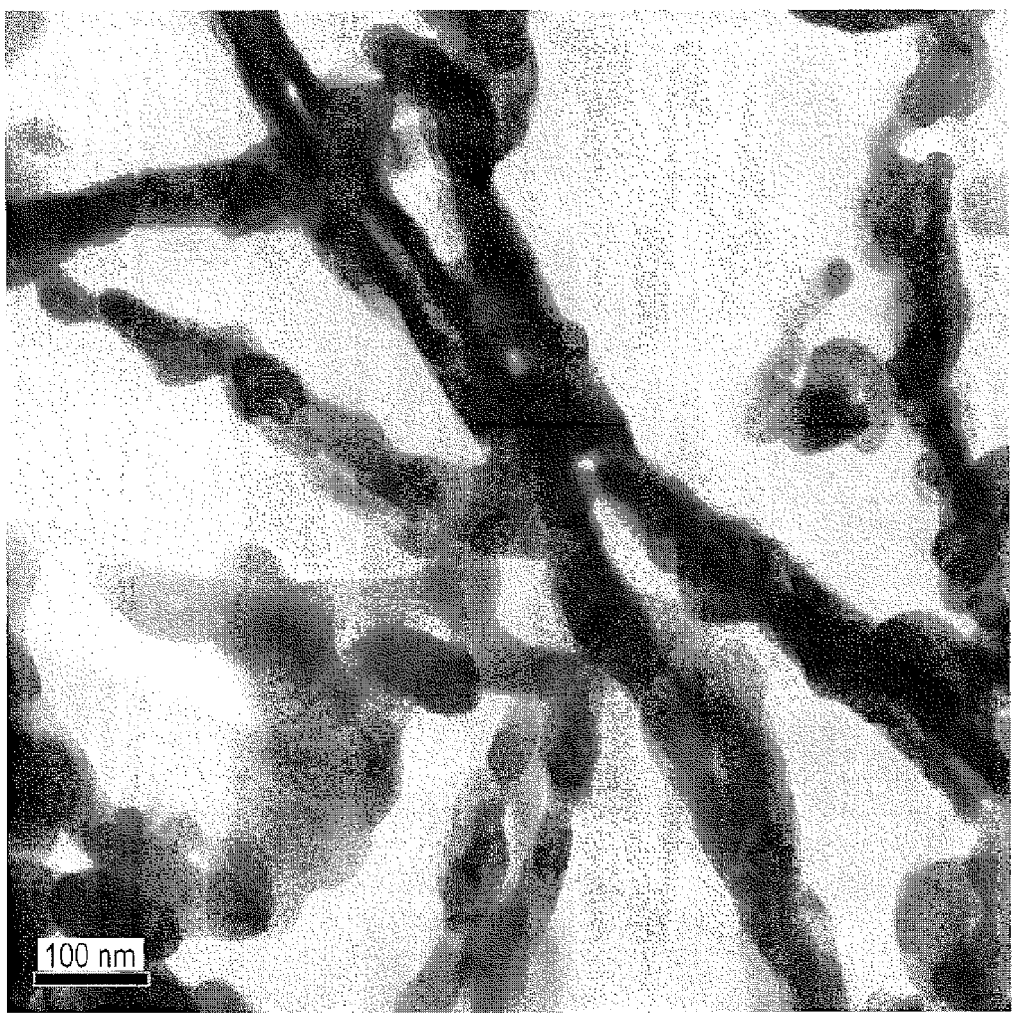
FIG. 2 is a TEM image of iron oxide with a chained structure which is used in a negative electrode active material for a lithium ion secondary battery according to the embodiment.

The above negative electrode active material contains secondary particles provided by primary particles containing iron oxide that are linked in a chain as shown in FIG. 2.

The primary particles containing iron oxide are linked in a chain, whereby the secondary particles are formed. Thus, the movement of electrons in the negative electrode active material occurs through the negative electrode active material surface. Accordingly, a reliable conductive path is ensured by the points of contact of the linked primary particles. A conventional conductive path is merely an irregular conductive path based on points of contact between particles. However, in the negative electrode active material according to the embodiment of the present disclosure, a more efficient and reliable conductive path is ensured by the regular conductive path. Thus, a large discharge capacity can be provided.

Further, because the primary particles are linked in a chain, aggregation where the primary particles gather at one location does not occur. Thus, a reliable conductive path is formed between the primary particles and the conductive auxiliary agent. Accordingly, even larger discharge capacity can be provided.

Incidentally, "in a chain" refers to a state such that a plurality of particles is linked to form a chain by connection of the particles and the ratio of the long axis length to the short axis length of the secondary particle is 10 or more.

The particle diameter of the primary particle containing iron oxide may be not more than three times the crystallite diameter of iron oxide.

When the primary particle diameter is not more than three times the crystallite diameter, the crystal boundary in the primary particles decreases. Thus, the electric resistance in the primary particles decreases, whereby high discharge capacity can be obtained.

The primary particle diameter can be determined by the following technique. Specifically, synthesized iron oxides are observed by a transmission electron microscope (TEM). From an obtained TEM image, the diameters of randomly selected 20 particles of iron oxide particles are measured. A trimmed mean excluding the upper and lower 10% of the diameters of the iron oxide particles is calculated as the primary particle diameter.

The crystallite diameter can be determined by the following technique. Specifically, synthesized iron oxides are measured by an X-ray diffraction device. From an obtained profile, the size of the crystallite corresponding to each peak is calculated with respect to major peaks according to the following mathematical formula (1). An average value of the calculated values is determined as the size of the crystallite of the obtained iron oxide.

$$L = K\lambda/(\beta \cos \theta) \quad (1)$$

where L is the size of the crystallite, K is the Scherrer constant, $\lambda$ is the wavelength of the used X-ray tube, $\beta$ is the full width at half maximum after correction of overall device error, and $\theta$ is the diffraction angle.

The diameter in the short axis direction of the secondary particles extending in a chain, which can be confirmed by transmission electron microscope observation, may be not more than twice the particle diameter of the primary particles.

When the diameter in the short axis direction of the secondary particles is not more than twice the particle diameter of the primary particles, the respective primary particles are exposed on the secondary particle surface.

Thus, a more reliable conductive path is formed between the primary particles and the conductive auxiliary agent. Accordingly, high discharge capacity can be obtained.

Figure 3:
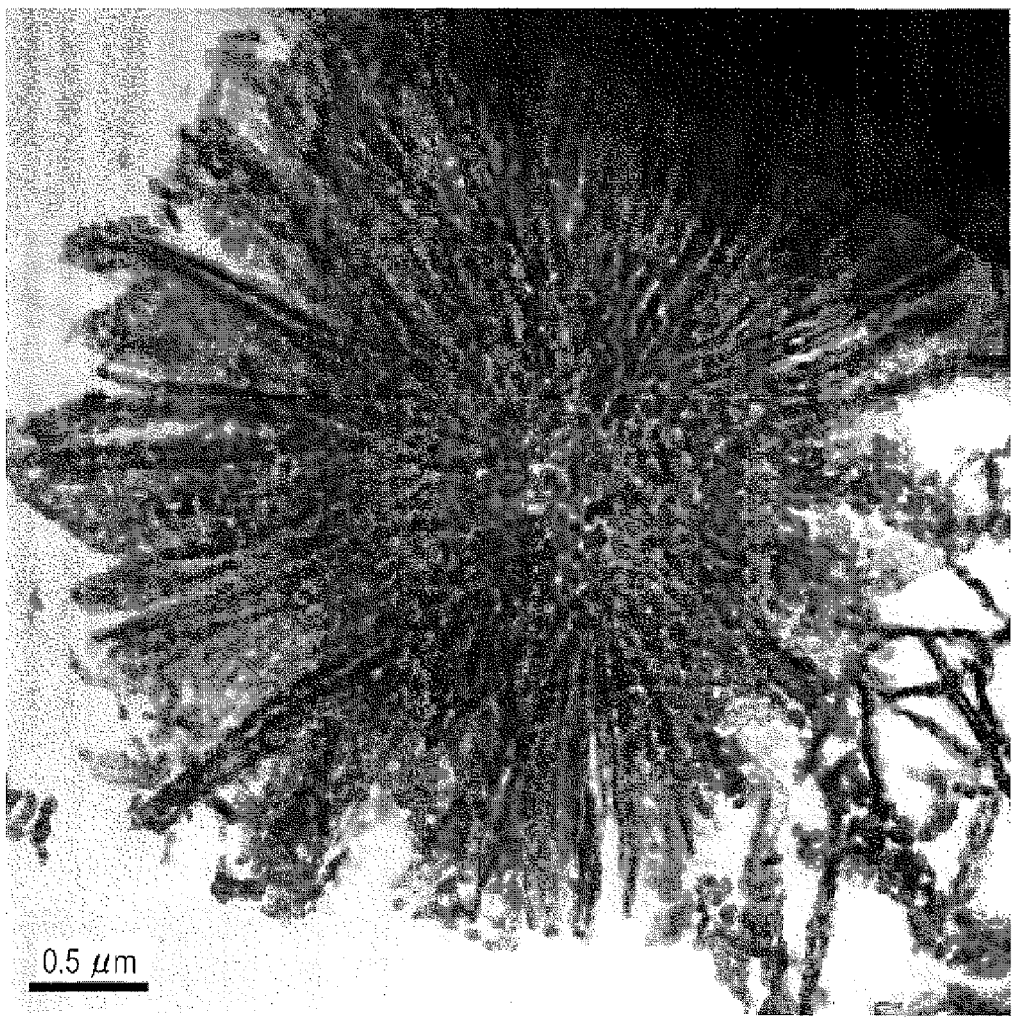
FIG. 3 shows a TEM image of radially aggregated iron oxide with a chained structure which is used in the negative electrode active material for a lithium ion secondary battery according to the embodiment.

Further, as shown in FIG. 3, the secondary particles may be regularly radially aggregated.

Because the secondary particles are regularly radially aggregated, the conductive auxiliary agent is closely inserted between the secondary particles when the negative electrode is fabricated using the secondary particles. Thus, a favorable conductive path can be obtained between the primary particles forming the secondary particles and the conductive auxiliary agent. Further, appropriate spaces are retained between the secondary particles. Accordingly, electrolytic solution permeability can be improved. With such a structure, the $Li^+$ ion conductivity in the negative electrode is improved, whereby high discharge capacity can be obtained. Here, "regularly radially aggregated" refers to a state such that a plurality of secondary particles is radially extended from a starting point at which one ends of the secondary particles formed by primary particles linked in a chain are gathered. This radially-extended structure can be confirmed through an observed image obtained by a transmission electron microscope (TEM).

The radial aggregation may form a structure having a hollow at the center, as shown in FIG. 3 by way of example. The hole can be easily confirmed by shades in an observed image obtained by observing the aggregate by the transmission electron microscope (TEM).

As the iron oxide used as the negative electrode active material, $FeO$, $Fe_2O_3$, $Fe_3O_4$ or the like may be used. In particular, $Fe_2O_3$ with the largest theoretical capacity may be used. Further, by using $\alpha$-$Fe_2O_3$ which is thermodynamically stable, excellent charging and discharging cycle characteristics can be obtained. As the negative electrode active material, $\alpha$-$Fe_2O_3$ may be used either individually or in combination with other iron oxides. In another example, the iron oxide may be used in combination with a negative electrode active material, such as a metal capable of forming a compound with lithium such as silicon or tin, an amorphous compound mainly containing an oxide of the metal, lithium titanate ($Li_4Ti_5O_{12}$), or graphite.

The content of the negative electrode active material in the negative electrode active material layer 24 may be 50 to 95 mass %, or 75 to 93 mass %, with respect to a total of the masses of the negative electrode active material, the conductive auxiliary agent, and the binder. When the content of the negative electrode active material is in the above range, a negative electrode having large capacity can be obtained.

(Method for Fabricating Negative Electrode Active Material)

A two-solution circulation-type supercritical hydrothermal synthesis device was used to synthesize $\alpha$-$Fe_2O_3$ having a chain structure. First, water-soluble iron salt and neutralizer were dissolved in water, preparing an iron solution. The iron solution was then passed through a preheating tube, a reaction tube, and a cooling tube in order at a flow rate of 25 to 120 ml/min. Also, 30% hydrogen peroxide water as an oxidant was passed through the reaction tube and the cooling tube in order at a flow rate of 12 to 36 ml/min. Under conditions of a preheating temperature of 180° C. and a reaction temperature of 400 to 550° C., supercritical hydrothermal synthesis was performed in such a manner. The two-solution circulation-type supercritical hydrothermal synthesis device was designed such that the iron solution and the 30% hydrogen peroxide water would be mixed immediately before the reaction tube. The resultant slurry was filtered, rinsed in water, ethanol-cleaned, and dried. Thereafter, the dried slurry was fired in air, fabricating $\alpha$-$Fe_2O_3$ having a chain structure.

Examples of the iron salt that may be used include iron chloride, iron sulfate, iron nitrate, ferric citrate, and iron phosphate. From the viewpoint of solubility in water, iron chloride, iron sulfate, or iron nitrate may be preferably used. Hydrates of the above examples may also be used. One or more types of the examples may be used in combination. The iron source charging concentration may be 0.02 to 0.2 M. When the iron source charging concentration is below 0.02 M, no linking of the primary particles occurs, so that $\alpha$-$Fe_2O_3$ having a chained structure cannot be obtained. When the iron source charging concentration is more than 0.2 M, excessive growth and aggregation of the primary particles occurs, so that $\alpha$-$Fe_2O_3$ having a chained structure cannot be obtained.

As the neutralizer, monoethanolamine, triethanolamine, urea or the like may be used. In order to suppress production of acid in the aqueous solution resulting from the reaction, the amount of the added neutralizer may be largely excessive as compared to the amount of the iron salt anion.

The filtering method is not particularly limited. Known filter paper with a pore size such that the produced $\alpha$-$Fe_2O_3$ can be trapped may be used. For example, filter paper, glass filter, or membrane filter may be used.

The drying method may be performed at 150° C. or lower to prevent drying coagulation. In particular, reduced-pressure drying may be performed at 60 to 90° C. for 6 to 12 hours.

The firing method may be performed at 800° C. or lower to suppress $\alpha$-$Fe_2O_3$ grain growth. In particular, the firing may be performed in air at 400 to 600° C. for 1 to 6 hours.

(Binder)

The binder binds negative electrode active materials and also binds the negative electrode active material and the current collector 22. The binder is not particularly limited as long as the binder is capable of achieving the above binding. Examples of the binder include fluorine resin such as polyvinylidene fluoride (PVDF), cellulose, styrene-butadiene rubber, polyimide, polyamide-imide, polyacrylic acid, polyacrylonitrile, and polyalginic acid.

The content of the binder in the negative electrode active material layer 24 is not particularly limited, and may be 1 to 30 mass % with respect to the total of the masses of the negative electrode active material, the conductive auxiliary agent, and the binder. In particular, the content may be 5 to 15 mass %.

(Conductive Auxiliary Agent)

The conductive auxiliary agent is not particularly limited as long as the agent is capable of improving the conductivity of the negative electrode active material layer 24. Known conductive auxiliary agent may be used. Examples thereof include: carbon blacks such as acetylene black, furnace black, channel black, thermal black, and Ketjen black; carbon fibers such as vapor-grown carbon fiber (VGCF) and carbon nanotube; and carbon material such as graphite. One or more types of these examples may be used.

The content of the conductive auxiliary agent in the negative electrode active material layer 24 is also not particularly limited. When added, normally, the content may be 1 to 10 mass % with respect to the total of the masses of the negative electrode active material, the conductive auxiliary agent, and the binder.

(Solvent)

The solvent is not particularly limited as long as the solvent is capable of rendering the negative electrode active material, the conductive auxiliary agent, and the binder into a paint. For example, N-methyl-2-pyrrolidone and N,N-dimethyl formamide may be used.

(Negative Electrode Current Collector)

The negative electrode current collector 22 may be a conductive plate material having a small thickness. In particular, the negative electrode current collector 22 may be a metal foil with a thickness of 8 to 30 μm. The negative electrode current collector 22 may be formed from a material that does not form an alloy with lithium. For example, copper is particularly preferable. Examples of such copper foil include electrolytic copper foil. The electrolytic copper foil is obtained by, for example, causing a current to flow while a metal drum immersed in copper ions-dissolved electrolyte is rotated. Copper is precipitated on the drum surface and then is detached, whereby electrolytic copper foil is obtained.

The copper foil may be pressed copper foil manufactured by pressing cast copper ingot into a desired thickness. The pressed copper foil may be used after the surface of copper precipitated on the surface of the pressed copper foil by electrolytic process is made coarse.

The coating method is not particularly limited. Methods that are normally adopted for fabricating an electrode may be used. Examples thereof include a slit die coating method and a doctor blade method.

The method for removing the solvent in the paint coated on the negative electrode current collector 22 is not particularly limited. For example, the negative electrode current collector 22 coated with the paint may be dried at 80° C. to 150° C.

The negative electrode 20 including the negative electrode active material layer 24 formed as described above may be thereafter subjected to a pressing process using a roll press device or the like, as needed. The roll press may have a linear pressure of 100 to 5000 kgf/cm, for example.

(Nonaqueous Electrolytic Solution)

The nonaqueous electrolytic solution includes a non-aqueous solvent and an electrolyte dissolved in the non-aqueous solvent. The nonaqueous electrolytic solution may contain, as the non-aqueous solvent, a cyclic carbonate and a chain carbonate.

The cyclic carbonate is not particularly limited as long as the carbonate is capable of electrolyte solvation. Known cyclic carbonates may be used. For example, ethylene carbonate, propylene carbonate, or butylene carbonate may be used.

The chain carbonate is not particularly limited as long as the carbonate is capable of decreasing the viscosity of the cyclic carbonate. Known chain carbonates may be used. For example, diethyl carbonate, dimethylcarbonate, or ethylmethyl carbonate may be used. In other examples, methyl acetate, ethyl acetate, methyl propionate, ethyl propionate, γ-butyrolactone, 1,2-dimethoxyethane, or 1,2-diethoxyethane may be used in combination with cyclic and chain carbonates.

The ratio of the cyclic carbonate to the chain carbonate in the non-aqueous solvent may be 1:9 to 1:1 by volume.

Examples of the electrolyte that may be used include lithium salts of $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. One or more of the lithium salts may be used either individually or in combination of two or more types. In particular, from the viewpoint of conductivity, $LiPF_6$ may also be included.

When $LiPF_6$ is dissolved in the non-aqueous solvent, the concentration of the electrolyte in the nonaqueous electrolytic solution may be adjusted to 0.5 to 2.0 mol/L. When the concentration of the electrolyte is 0.5 mol/L or more, sufficient conductivity of the nonaqueous electrolytic solution can be ensured. Further, sufficient capacity can be readily obtained at the time of charging and discharging. By suppressing the electrolyte concentration within 2.0 mol/L, sufficient lithium ion mobility can be ensured while suppressing an increase in the viscosity of the nonaqueous electrolytic solution. Thus, sufficient capacity can be readily obtained at the time of charging and discharging.

Even when $LiPF_6$ is mixed with another electrolyte, the lithium ion concentration in the nonaqueous electrolytic solution can be adjusted to 0.5 to 2.0 mol/L. The concentration of the lithium ion from $LiPF_6$ may be 50 mol % or more.

(Positive Electrode)

The positive electrode 10 according to the embodiment has a structure such that the positive electrode active material layer 14 containing a positive electrode active material is formed on one surface or both surfaces of the positive electrode current collector 12. The positive electrode active material layer 14 can be manufactured by coating a paint containing the positive electrode active material, a binder, a conductive auxiliary agent, and a solvent onto the positive electrode current collector 12 through the same steps as those of the negative electrode manufacturing method. By removing the solvent from the paint coated on the positive electrode current collector 12, the positive electrode 10 is manufactured.

The positive electrode active material is not particularly limited as long as the material is a substance capable of reversibly proceeding adsorption and desorption of lithium ions, deintercalation and insertion (intercalation) of lithium ions, or doping and undoping of lithium ions and counter anions of the lithium ions (such as $ClO_4^-$). Any known electrode active material may be used. Examples thereof include lithium cobalt oxide ($LiCoO_2$), lithium nickel oxide ($LiNiO_2$), lithium manganese spinel ($LiMn_2O_4$), a mixed metal oxide expressed by the general formula: $LiNi_xCo_yMn_zO_2$ (x+y+z=1), lithium vanadium compound ($LiV_2O_5$), and $LiMPO_4$ (where M is Co, Ni, Mn, Fe, or VO).

Oxides and sulfides capable of lithium ion adsorption and desorption may also be used as the positive electrode active material.

For the constituent elements other than the positive electrode active material (the conductive auxiliary agent and the binder), the same substances used for the negative electrode 20 may be used.

As the positive electrode current collector 12, various known metal foils used in current collectors for lithium ion secondary batteries may be used. For example, metal foil of aluminum, stainless steel, nickel, titanium, or alloys thereof may be used. In particular, aluminum foil may be used.

(Separator)

The material, the manufacturing method and the like of the separator 18 are not particularly limited as long as the separator 18 is formed from an insulating porous structure. Known separators used in lithium ion secondary batteries may be used. Examples of the insulating porous structure include known polyolefin resins, specifically crystalline homopolymers or copolymers obtained by polymerizing polyethylene, polypropylene, 1-butene, 4-methyl-1-pentene, 1-hexene and the like. One type of the homopolymers and copolymers may be used individually. Two or more types of these polymers may be used in combination. The separator 18 may include a single layer structure or a complex layer structure.

(Case)

The case 50 is not particularly limited as long as the case is capable of preventing electrolyte leakage to the outside and entry of water and the like into the lithium ion secondary battery 100 from the outside. Metal can or aluminum-laminated film may be used. For example, the aluminum-laminated film is provided such that a three-layer structure is formed by polypropylene, aluminum, and nylon stacked in this order.

The negative electrode lead 62 and the positive electrode lead 60 may be formed from a conductive material such as aluminum or nickel.

The embodiment of the present disclosure has been described in detail, but the present disclosure is not limited to the foregoing embodiment. The embodiment described above in detail may be variously modified. For example, in the foregoing embodiment, the lithium ion secondary battery has the laminate film structure. However, the lithium secondary battery according to the embodiment of the present disclosure may be a lithium ion secondary battery with a structure such that the positive electrode and the negative electrode are folded or a structure such that the positive electrode and the negative electrode are stacked. Further, the shape of the lithium ion secondary battery may include a coin-like shape, a rectangular shape, and a flat shape, for example.

The fabricated lithium ion secondary battery was evaluated by the following method.
(Measurement of Discharge Capacity)

Discharge capacity was evaluated by performing charging at a current value of 0.1 C and discharging at a current value of 0.1 C in a voltage range of 4.0 V to 1.0 V with use of a secondary battery charging and discharging test device. Herein, a current value of 1 C refers to a current value such that, when constant current charging or constant current discharging is performed using a battery cell with the capacity of a nominal capacity value, the charging or discharging can be completed in just one hour.

The discharge capacity (mAh/g) was evaluated using the initial discharge capacity of the first cycle.
(Measurement of Charging and Discharging Cycle Characteristics)

With use of the same device as for the discharge capacity measurement, the charging and discharging cycle characteristics were evaluated under the conditions of charging at a current value of 0.1 C and discharging at a current value of 0.1 C. The capacity retention (%) is expressed as the ratio of the discharge capacity of each cycle to the initial discharge capacity which is the discharge capacity of the first cycle, according to the following mathematical formula (2).

$$\text{Discharge capacity retention (\%)} = \frac{\text{Discharge capacity of each cycle}}{\text{Initial discharge capacity}} \times 100 \quad (2)$$

The higher the capacity retention is, the better the charging and discharging cycle characteristics are. In Examples and Comparative Examples, charging and discharging were repeated under the above conditions with use of fabricated lithium ion secondary batteries. The charging and discharging cycle characteristics were evaluated based on the capacity retention after 100 cycles.

In the following, the lithium ion secondary battery according to the embodiment of the present disclosure will be described in further detail with reference to Examples and Comparative Examples. The lithium ion secondary battery is not limited to secondary batteries described in these examples.

The lithium ion secondary batteries used in Examples 1 to 9 and in Comparative Examples 1 and 2 were fabricated according to the procedure described below.

EXAMPLES

Example 1

Preparation of Negative Electrode Active Material

An iron solution containing 0.02 M of ferrous sulfate hydrate (78% as $Fe_2(SO_4)_3$) and 0.6 M of triethanolamine was prepared. Then, the iron solution was passed through a preheating tube, a reaction tube, and a cooling tube in order at a flow rate of 80 ml/min. In such a manner, supercritical hydrothermal synthesis was performed under the conditions of a flow rate of 24 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours, whereby $\alpha$-$Fe_2O_3$, in which secondary particles formed by chained primary particles of Example 1 were further radially aggregated, was fabricated as shown in FIG. 3.
(Measurement of Crystallite)

An X-ray diffraction device was used to perform measurement in a range of $2\theta=10$ to $90°$. A resultant X-ray diffraction profile of the iron oxide agreed to an X-ray diffraction profile of $\alpha$-$Fe_2O_3$. With respect to the obtained diffraction peaks of (012), (104), (110), (113), (024), (116), (018), (214), and (300), the crystallite size was calculated. An average value of the calculated values was determined as the crystallite size of Example 1.

In any of Examples and Comparative Examples, the obtained iron oxide was $\alpha$-$Fe_2O_3$. Thus, the average value of the crystallite sizes obtained from the diffraction peaks of (012), (104), (110), (113), (024), (116), (018), (214), and (300) was determined as the crystallite size of each of Examples and Comparative Examples.
(Fabrication of Negative Electrode)

85 parts by mass of the $\alpha$-$Fe_2O_3$ prepared for Example 1 as the negative electrode active material, 5 parts by mass of Ketjen black as the conductive auxiliary agent, and 10 parts by mass of polyamide-imide as the binder were mixed to prepare a negative electrode mixture. Then, the negative electrode mixture was dispersed in N-methyl-2-pyrrolidone to prepare a paste of negative electrode mixture paint. The paint was coated onto one surface of an electrolytic copper foil with a thickness of 10 μm such that the amount of coating of the negative electrode active material was 2.5 mg/cm$^2$. Thereafter, the coated electrolytic copper foil was dried at 100° C. to form a negative electrode active material layer. Then, pressure forming was implemented at a linear pressure of 2000 kgf/cm using a roller press. Finally, heating was performed in vacuum at 350° C. for three hours, and thus a negative electrode with a thickness of 70 μm was fabricated.
(Fabrication of Positive Electrode)

90 parts by mass of $LiCoO_2$ as the positive electrode active material, 5 parts by mass of acetylene black as the conductive auxiliary agent, and 5 parts by mass of polyvinylidene fluoride as the binder were mixed to prepare a positive electrode mixture. The positive electrode mixture was then dispersed in N-methyl-2-pyrrolidone to prepare a paste of positive electrode mixture paint. The paint was coated onto one surface of an aluminum foil with a thickness of 20 µm such that the amount of coating of the positive electrode active material was 18.4 mg/cm$^2$. Thereafter, the coated aluminum foil was dried at 100° C. to form a positive electrode active material layer. Then, by pressure forming using a roll press, a positive electrode with a thickness of 132 µm was fabricated.

(Fabrication of Lithium Ion Secondary Battery for Evaluation)

The fabricated negative electrode and positive electrode were stacked via a polypropylene separator with a thickness of 16 µm, whereby a stacked body was fabricated. Three sheets of the negative electrode, two sheets of the positive electrode, and four sheets of the separator were used. The negative electrode and the positive electrode were alternately stacked via the separator. Further, in the negative electrode of the electrode body, a nickel negative electrode lead was attached to a protruding end portion of the copper foil to which the negative electrode active material layer was not provided. On the other hand, in the positive electrode of the stacked body, an aluminum positive electrode lead was attached to a protruding end portion of the aluminum foil to which the positive electrode active material layer was not provided, using an ultrasonic welding machine. The stacked body was then inserted into a case of aluminum-laminated film. Thereafter, a closed opening was formed by heat-sealing the case except for one location around the case. A nonaqueous electrolytic solution containing a solvent including EC/DEC at a compounding ratio of 3:7 and 1 M (mol/L) of LiPF$_6$ added into the solvent as a lithium salt was injected into the case. Thereafter, the remaining one location was heat-sealed using a vacuum sealing machine under reduced pressure so as to hermetically seal the case, whereby the lithium ion secondary battery according to Example 1 was fabricated.

Example 2

An iron solution containing 0.04 M of ferrous sulfate hydrate and 0.24 M of triethanolamine was prepared. Then, the iron solution was passed through a preheating tube, a reaction tube, and a cooling tube in order at a flow rate of 80 ml/min. In such a manner, supercritical hydrothermal synthesis was performed under the conditions of a flow rate of 18 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours, whereby α-Fe$_2$O$_3$, in which secondary particles formed by chained primary particles of Example 2 were further radially aggregated, was fabricated.

A lithium ion secondary battery according to Example 2 was fabricated in the same manner as in Example 1, using the α-Fe$_2$O$_3$ of Example 2.

Example 3

An iron solution containing 0.08 M of ferrous sulfate hydrate and 0.48 M of triethanolamine was prepared. Then, the iron solution was passed through a preheating tube, a reaction tube, and a cooling tube in order at a flow rate of 20 ml/min. In such a manner, supercritical hydrothermal synthesis was performed under the conditions of a flow rate of 18 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours, whereby α-Fe$_2$O$_3$ in which secondary particles were formed by chained primary particles of Example 3 was fabricated as shown in FIG. 2.

A lithium ion secondary battery according to Example 3 was fabricated in the same manner as in Example 1, using the α-Fe$_2$O$_3$ of Example 3.

Example 4

An iron solution containing 0.08 M of ferrous sulfate hydrate and 0.48 M of triethanolamine was prepared. Then, the iron solution was passed through a preheating tube, a reaction tube, and a cooling tube in order at a flow rate of 30 ml/min. In such a manner, supercritical hydrothermal synthesis was performed under the conditions of a flow rate of 15 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours, whereby α-Fe$_2$O$_3$ in which secondary particles were formed by chained primary particles of Example 4 was fabricated.

A lithium ion secondary battery according to Example 4 was fabricated in the same manner as in Example 1, using the α-Fe$_2$O$_3$ of Example 4.

Example 5

An iron solution containing 0.08 M of ferrous sulfate hydrate and 0.48 M of triethanolamine was prepared. Then, the iron solution was passed through a preheating tube, a reaction tube, and a cooling tube in order at a flow rate of 30 ml/min. In such a manner, supercritical hydrothermal synthesis was performed under the conditions of a flow rate of 15 ml/min of 30% hydrogen peroxide water and a reaction temperature of 550° C. The obtained slurry was filtered, rinsed, ethanol-cleaned, and dried. Thereafter, the dried slurry was fired in air at 500° C. for three hours, whereby α-Fe$_2$O$_3$ in which secondary particles were formed by chained primary particles of Example 5 was fabricated.

A lithium ion secondary battery according to Example 5 was fabricated in the same manner as in Example 1, using the α-Fe$_2$O$_3$ of Example 5.

Example 6

An iron solution containing 0.16 M of ferrous sulfate hydrate and 0.48 M of triethanolamine was prepared. Then, the iron solution was passed through a preheating tube, a reaction tube, and a cooling tube in order at a flow rate of 30 ml/min. In such a manner, supercritical hydrothermal synthesis was performed under the conditions of a flow rate of 15 ml/min of 30% hydrogen peroxide water and a reaction temperature of 550° C. The obtained slurry was filtered, rinsed, ethanol-cleaned, and dried. Thereafter, the dried slurry was fired in air at 500° C. for three hours, whereby α-Fe$_2$O$_3$ in which secondary particles were formed by chained primary particles of Example 6 was fabricated.

A lithium ion secondary battery according to Example 6 was fabricated in the same manner as in Example 1, using the α-Fe$_2$O$_3$ of Example 6.

Example 7

An iron solution containing 0.18 M of ferrous sulfate hydrate and 0.72 M of triethanolamine was prepared. Then, the iron solution was passed through a preheating tube, a reaction tube, and a cooling tube in order at a flow rate of 30 ml/min. In such a manner, supercritical hydrothermal synthesis was performed under the conditions of a flow rate of 15 ml/min of 30% hydrogen peroxide water and a reaction temperature of 550° C. The obtained slurry was filtered, rinsed, ethanol-cleaned, and dried. Thereafter, the dried slurry was fired in air at 500° C. for three hours. Accordingly, $\alpha\text{-Fe}_2\text{O}_3$ in which secondary particles were formed by chained primary particles of Example 7 was fabricated.

A lithium ion secondary battery according to Example 7 was fabricated in the same manner as in Example 1, using the $\alpha\text{-Fe}_2\text{O}_3$ of Example 7.

Example 8

An iron solution containing 0.18 M of ferrous sulfate hydrate and 1.8 M of triethanolamine was prepared. Then, the iron solution was passed through a preheating tube, a reaction tube, and a cooling tube in order at a flow rate of 30 ml/min. In this way, supercritical hydrothermal synthesis was performed under the conditions of a flow rate of 15 ml/min of 30% hydrogen peroxide water and a reaction temperature of 550° C. The obtained slurry was filtered, rinsed, ethanol-cleaned, and dried. Thereafter, the dried slurry was fired in air at 500° C. for three hours. Accordingly, $\alpha\text{-Fe}_2\text{O}_3$ in which secondary particles were formed by chained primary particles of Example 8 was fabricated.

A lithium ion secondary battery according to Example 8 was fabricated in the same manner as in Example 1, using the $\alpha\text{-Fe}_2\text{O}_3$ of Example 8.

Example 9

An iron solution containing 0.2 M of ferrous sulfate hydrate and 2.0 M of triethanolamine was prepared. Then, the iron solution was passed through a preheating tube, a reaction tube, and a cooling tube in order at a flow rate of 30 ml/min. In this way, supercritical hydrothermal synthesis was performed under the conditions of a flow rate of 15 ml/min of 30% hydrogen peroxide water and a reaction temperature of 550° C. The obtained slurry was filtered, rinsed, ethanol-cleaned, and dried. Thereafter, the dried slurry was fired in air at 500° C. for three hours. Accordingly, $\alpha\text{-Fe}_2\text{O}_3$ in which secondary particles were formed by chained primary particles of Example 9 was fabricated.

A lithium ion secondary battery according to Example 9 was fabricated in the same manner as in Example 1, using the $\alpha\text{-Fe}_2\text{O}_3$ of Example 9.

Comparative Example 1

An iron solution containing 0.3 M of ferrous sulfate hydrate and 0.3 M of triethanolamine was prepared. Then, the iron solution was passed through a preheating tube, a reaction tube, and a cooling tube in order at a flow rate of 90 ml/min. In such a manner, supercritical hydrothermal synthesis was performed under the conditions of a flow rate of 30 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours. Accordingly, spherical $\alpha\text{-Fe}_2\text{O}_3$ of Comparative Example 1 was fabricated.

A lithium ion secondary battery according to Comparative Example 1 was fabricated in the same manner as in Example 1, using the $\alpha\text{-Fe}_2\text{O}_3$ of Comparative Example 1.

Comparative Example 2

Ferric citrate hydrate was fired in air at 500° C. for three hours, obtaining $\alpha\text{-Fe}_2\text{O}_3$. The obtained $\text{Fe}_2\text{O}_3$ was then subjected to pulverizing process using a planetary ball mill, obtaining spherical $\alpha\text{-Fe}_2\text{O}_3$ of second comparative example. As a medium for the planetary ball mill, zirconium beads with a diameter of 3 mm were used. The rotational speed of the ball mill was 500 rpm. The pulverizing time of the ball mill was 120 min.

A lithium ion secondary battery according to Comparative Example 3 was fabricated using the $\alpha\text{-Fe}_2\text{O}_3$ of Comparative Example 2.

With respect to the obtained iron oxide according to Examples 1 to 9 and Comparative Examples 1 and 2, the particle shape of the iron oxide, the diameter of the primary particles forming the iron oxide, and the short axis of the secondary particles extending in a chain were measured through observation by a transmission electron microscope (TEM). As the short axis of the secondary particles extending in a chain, an average value of values at randomly selected 20 points was calculated. The results are shown in Table 1. The crystallite size was calculated from the result obtained by X-ray diffraction device. The results of calculation are also summarized in Table 1. Further, the discharge capacity of the lithium ion secondary battery fabricated using each iron oxide and the capacity retention after 100 cycles were also measured by the above-described measurement method. The results are summarized in Table 1.

As can be seen from Table 1, by using $\alpha\text{-Fe}_2\text{O}_3$ having a structure in which secondary particles are formed by primary particles linked in a chain as the negative electrode active material, the discharge capacity is significantly increased as compared with when spherical $\alpha\text{-Fe}_2\text{O}_3$ is used. In Comparative Examples 1 and 2, the shape of $\alpha\text{-Fe}_2\text{O}_3$ as the negative electrode active material is spherical. Thus, the conductive path is an irregular conductive path based on points of contact between particles. As a result, sufficient discharge capacity was not obtained.

Further, as can be seen from Examples 5 to 7, when the primary particle average diameter is not more than three times the iron oxide crystallite diameter, larger discharge capacity can be obtained. It is considered that this is because the electric resistance in the primary particles is decreased as a result of a decrease in crystal boundaries in the primary particles.

As can be seen from Examples 8 and 9, when the diameter in the short axis direction of the secondary particles extending in a chain is not more than twice the diameter of the primary particles, larger discharge capacity can be obtained. It is considered that this is because a more reliable conductive path is formed between the primary particles and the conductive auxiliary agent as a result of the individual primary particles being exposed to the secondary particle surface.

As can be seen from Examples 1 and 2 using the $\alpha\text{-Fe}_2\text{O}_3$ with the radially aggregated chained secondary particles, larger discharge capacity was obtained in these examples. The following reasons for this are conceivable. Namely, as the conductive auxiliary agent was closely inserted between the secondary particles, a favorable conductive path was obtained between the primary particles forming the secondary particles and the conductive auxiliary agent. Further, as appropriate spaces were retained between the secondary particles, electrolyte permeability was increased. As a result, $\text{Li}^+$ ion conductivity was increased, whereby high discharge capacity was obtained.

Surprisingly, charging and discharging cycle characteristics were also improved together with an increase in discharge capacity. Generally, an iron oxide such as $\alpha\text{-Fe}_2\text{O}_3$ is known to cause a volume change due to charging and discharging. Thus, the contact between some of primary particles and a conductive auxiliary agent may be lost by electrode expansion during charging. However, even in such a case, the $\alpha$-$Fe_2O_3$ that does not contribute to charging or discharging is not easily produced in Examples 1 and 2 because the $\alpha$-$Fe_2O_3$ particles are linked in a chain. This is believed to be a reason for improvement of the charging and discharging cycle characteristics.

TABLE 1

|  | Particle shape | Primary particle diameter (nm) | Crystallite size (nm) | (Primary particle diameter)/(crystallite size) | Diameter of secondary particle in short axis direction (nm) | (Diameter of secondary particle in short axis direction)/(primary particle diameter) | Discharge capacity (mAh/g) | Capacity retention after 100 cycles (%) |
|---|---|---|---|---|---|---|---|---|
| Ex. 1 | Radial aggregation | 42 | 39 | 1.1 | 50 | 1.2 | 1353 | 93 |
| Ex. 2 | Radial aggregation | 47 | 42.9 | 1.1 | 51 | 1.1 | 1319 | 93 |
| Ex. 3 | Chained | 62 | 47.5 | 1.3 | 81 | 1.3 | 1186 | 89 |
| Ex. 4 | Chained | 59 | 46.5 | 1.3 | 116 | 2.0 | 1162 | 87 |
| Ex. 5 | Chained | 68 | 41.3 | 1.6 | 186 | 2.7 | 946 | 81 |
| Ex. 6 | Chained | 98 | 42.4 | 2.3 | 114 | 1.2 | 888 | 80 |
| Ex. 7 | Chained | 119 | 40.9 | 3.0 | 127 | 1.1 | 847 | 79 |
| Ex. 8 | Chained | 191 | 48.8 | 3.9 | 207 | 1.1 | 701 | 71 |
| Ex. 9 | Chained | 238 | 57 | 4.2 | 521 | 2.2 | 677 | 69 |
| Comp. Ex. 1 | Spherical | 42 | 39 | 1.1 | — | — | 437 | 52 |
| Comp. Ex. 2 | Spherical | 148 | 58 | 2.6 | — | — | 382 | 41 |

The negative electrode active material for a lithium ion secondary battery according to the present disclosure may include the following first to fourth negative electrode active materials for a lithium ion secondary battery.

The first negative electrode active material for a lithium ion secondary battery includes primary particles containing iron oxide that are linked in a chain to form secondary particles.

The second negative electrode active material for a lithium ion secondary battery is the first negative electrode active material for a lithium ion secondary battery wherein the primary particles containing iron oxide have a diameter of not more than three times a crystallite diameter of the iron oxide.

The third negative electrode active material for a lithium ion secondary battery is the first or the second negative electrode active material for a lithium ion secondary battery wherein the secondary particles extending in a chain have a short axis direction diameter of not more than twice the primary particle diameter.

The fourth negative electrode active material for a lithium ion secondary battery is any of the first to the third negative electrode active materials for a lithium ion secondary battery wherein the secondary particles are radially aggregated.

A negative electrode for a lithium ion secondary battery according to the present disclosure may be a negative electrode for a lithium ion secondary battery that contains any of the first to the fourth negative electrode active materials.

A lithium ion secondary battery according to the present disclosure may be a lithium ion secondary battery including the negative electrode for a lithium ion secondary battery, a positive electrode, and a nonaqueous electrolyte.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

According to the present disclosure, a lithium ion secondary battery having a large discharge capacity can be provided.

What is claimed is:

1. A negative electrode active material for a lithium ion secondary battery, comprising secondary particles formed by primary particles containing iron oxide that are linked in a chain.

2. The negative electrode active material for a lithium ion secondary battery according to claim 1, wherein the primary particles have a diameter of not more than three times a crystallite diameter of the iron oxide.

3. The negative electrode active material for a lithium ion secondary battery according to claim 2, wherein the secondary particles extending in a chain have a short axis direction diameter of not more than twice the diameter of the primary particles.

4. The negative electrode active material for a lithium ion secondary battery according to claim 3, wherein the secondary particle are radially aggregated.

5. The negative electrode active material for a lithium ion secondary battery according to claim 2, wherein the secondary particles are radially aggregated.

6. The negative electrode active material for a lithium ion secondary battery according to claim 1, wherein the secondary particles extending in a chain have a short axis direction diameter of not more than twice a diameter of the primary particles.

7. The negative electrode active material for a lithium ion secondary battery according to claim 6, wherein the secondary particles are radially aggregated.

8. The negative electrode active material for a lithium ion secondary battery according to claim 1, wherein the secondary particles are radially aggregated.

9. A negative electrode for a lithium ion secondary battery, comprising the negative electrode active material according to claim 1.

10. A lithium ion secondary battery comprising:
the negative electrode according to claim 9;
a positive electrode; and
a nonaqueous electrolyte.

* * * * *